(12) United States Patent
Hadley (10) Patent No.: US 9,015,516 B2
(45) Date of Patent: Apr. 21, 2015

(54) STORING EVENT DATA AND A TIME VALUE IN MEMORY WITH AN EVENT LOGGING MODULE

(75) Inventor: Ted A Hadley, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 13/407,845

(22) Filed: Feb. 29, 2012

(65) Prior Publication Data

US 2013/0024716 A1 Jan. 24, 2013

Related U.S. Application Data

(60) Provisional application No. 61/509,078, filed on Jul. 18, 2011.

(51) Int. Cl.
| | | |
|---|---|---|
| *G06F 1/04* | (2006.01) | |
| *G06F 3/00* | (2006.01) | |
| *G06F 12/00* | (2006.01) | |
| *G06F 13/16* | (2006.01) | |
| *H04L 9/32* | (2006.01) | |
| *G06F 21/54* | (2013.01) | |
| *G06F 21/75* | (2013.01) | |
| *H04L 9/08* | (2006.01) | |
| *G06F 1/24* | (2006.01) | |
| *G06F 21/57* | (2013.01) | |
| *G06F 12/14* | (2006.01) | |
| *G06F 21/60* | (2013.01) | |

(Continued)

(52) U.S. Cl.
CPC .............. *G06F 13/1642* (2013.01); *H04L 9/32* (2013.01); *G06F 21/54* (2013.01); *G06F 21/75* (2013.01); *H04L 9/0816* (2013.01); *G06F 1/24* (2013.01); *G06F 21/57* (2013.01); *G06F 12/1433* (2013.01); *G06F 21/602* (2013.01); *G06F 21/55* (2013.01); *G06F 21/575* (2013.01); *G06F 21/72* (2013.01); *G06F 13/1663* (2013.01); *H04L 9/088* (2013.01); *H04L 2209/12* (2013.01)

(58) Field of Classification Search
None
See application file for complete search history.

(56) References Cited

U.S. PATENT DOCUMENTS

| 3,183,498 A | 5/1965 | Howe et al. |
|---|---|---|
| 5,131,040 A | 7/1992 | Knapczyk |

(Continued)

FOREIGN PATENT DOCUMENTS

| CN | 101995301 | 3/2011 |
|---|---|---|
| EP | 0987625 | 3/2000 |

(Continued)

OTHER PUBLICATIONS

"ARM Security Technology Building a Secure System Using TrustZone® Technology", < http://infocenter.arm.com/help/topic/com.arm.doc.prd29-genc-009492c/PRD29-GENC-009492C_trustzone_security_whitepaper.pdf > Issue: C, 2009.

(Continued)

*Primary Examiner* — Ji H Bae (74) *Attorney, Agent, or Firm* — Hewlett-Packard Development Company, L.P.

(57) ABSTRACT

Example embodiments disclosed herein relate to storing event data and a time value in memory with an event logging module. Example embodiments of the event logging module include event command storage, clock command storage, and memory command storage.

15 Claims, 4 Drawing Sheets

(51) Int. Cl.
*G06F 21/55* (2013.01)
*G06F 21/72* (2013.01)

(56) References Cited

U.S. PATENT DOCUMENTS

| | | | |
|---|---|---|---|
| 5,214,760 A * | 5/1993 | Hammond et al. | 710/52 |
| 5,249,286 A | 9/1993 | Alpert et al. | |
| 5,379,378 A * | 1/1995 | Peters et al. | 710/105 |
| 5,406,630 A | 4/1995 | Piosenka et al. | |
| 5,469,564 A | 11/1995 | Junya | |
| 5,497,497 A | 3/1996 | Miller et al. | |
| 5,568,529 A | 10/1996 | Masuda | |
| 5,600,576 A | 2/1997 | Broadwater et al. | |
| 5,682,328 A | 10/1997 | Roeber et al. | |
| 5,825,878 A | 10/1998 | Takahashi et al. | |
| 5,872,967 A | 2/1999 | DeRoo et al. | |
| 5,937,063 A | 8/1999 | Davis | |
| 6,078,873 A | 6/2000 | Shutty et al. | |
| 6,188,603 B1 | 2/2001 | Takada | |
| 6,292,898 B1 | 9/2001 | Sutherland | |
| 6,377,691 B1 | 4/2002 | Swift et al. | |
| 6,424,143 B1 | 7/2002 | Blossfeld et al. | |
| 6,553,492 B1 | 4/2003 | Hosoe | |
| 6,553,496 B1 | 4/2003 | Buer | |
| 6,625,727 B1 | 9/2003 | Moyer et al. | |
| 6,687,140 B2 | 2/2004 | Kitamura | |
| 6,704,865 B1 | 3/2004 | Duff | |
| 6,789,182 B1 | 9/2004 | Brothers et al. | |
| 6,835,579 B2 | 12/2004 | Elward | |
| 6,836,548 B1 | 12/2004 | Anderson et al. | |
| 6,859,876 B2 | 2/2005 | Dykes et al. | |
| 6,910,094 B1 | 6/2005 | Eslinger et al. | |
| 6,928,551 B1 | 8/2005 | Lee | |
| 7,039,816 B2 | 5/2006 | Kocher et al. | |
| 7,057,396 B2 | 6/2006 | Nagase | |
| 7,062,615 B2 | 6/2006 | Miller et al. | |
| 7,107,459 B2 | 9/2006 | Caronni et al. | |
| 7,218,567 B1 | 5/2007 | Trimberger et al. | |
| 7,222,053 B2 | 5/2007 | Snyder et al. | |
| 7,237,121 B2 | 6/2007 | Cammack et al. | |
| 7,299,365 B2 | 11/2007 | Evans | |
| 7,305,534 B2 | 12/2007 | Watt et al. | |
| 7,360,073 B1 | 4/2008 | Billstrom et al. | |
| 7,398,441 B1 | 7/2008 | Gee | |
| 7,423,529 B2 | 9/2008 | Singer et al. | |
| 7,424,398 B2 | 9/2008 | Booth et al. | |
| 7,457,960 B2 | 11/2008 | Kablotsky | |
| 7,512,719 B1 | 3/2009 | Gillespie | |
| 7,525,836 B2 | 4/2009 | Backus et al. | |
| 7,549,064 B2 | 6/2009 | Elbert et al. | |
| 7,568,112 B2 | 7/2009 | Yamaguchi et al. | |
| 7,571,475 B2 | 8/2009 | Moon | |
| 7,580,919 B1 | 8/2009 | Hannel et al. | |
| 7,657,760 B2 | 2/2010 | Teramoto et al. | |
| 7,667,997 B2 | 2/2010 | Rodriguez | |
| 7,681,024 B2 | 3/2010 | Kwon | |
| 7,729,156 B2 | 6/2010 | Rodriguez et al. | |
| 7,733,250 B1 | 6/2010 | Tsyrganovich | |
| 7,757,098 B2 | 7/2010 | Brannock et al. | |
| 7,761,904 B2 | 7/2010 | Hessel et al. | |
| 7,774,619 B2 | 8/2010 | Paaske et al. | |
| 7,831,839 B2 | 11/2010 | Hatakeyama | |
| 7,844,835 B2 | 11/2010 | Ginter et al. | |
| 7,937,596 B2 | 5/2011 | Mackey et al. | |
| 7,949,912 B1 | 5/2011 | Trimberger | |
| 7,954,153 B2 | 5/2011 | Bancel et al. | |
| 7,966,467 B1 | 6/2011 | Ludloff et al. | |
| 8,027,927 B2 | 9/2011 | Ogg et al. | |
| 8,046,574 B2 | 10/2011 | Dale et al. | |
| 2001/0010086 A1 | 7/2001 | Katayama et al. | |
| 2002/0120851 A1 | 8/2002 | Clarke | |
| 2002/0129195 A1 | 9/2002 | Hongo et al. | |
| 2003/0133574 A1 | 7/2003 | Caronni et al. | |
| 2004/0078664 A1 | 4/2004 | Takahashi | |
| 2004/0153593 A1 | 8/2004 | Watt et al. | |
| 2004/0210764 A1 | 10/2004 | McGrath et al. | |
| 2005/0091554 A1 | 4/2005 | Loukianov | |
| 2005/0144358 A1 | 6/2005 | Conley et al. | |
| 2005/0235166 A1 | 10/2005 | England et al. | |
| 2006/0010356 A1 | 1/2006 | Snyder et al. | |
| 2006/0023486 A1 | 2/2006 | Furusawa et al. | |
| 2006/0031685 A1 | 2/2006 | Chen et al. | |
| 2006/0059373 A1 | 3/2006 | Fayad et al. | |
| 2006/0090084 A1 | 4/2006 | Buer | |
| 2006/0095726 A1 | 5/2006 | Zaabab et al. | |
| 2006/0101241 A1 | 5/2006 | Curran et al. | |
| 2006/0168212 A1 | 7/2006 | Parsons et al. | |
| 2006/0179302 A1 | 8/2006 | Hatakeyama | |
| 2006/0179324 A1 | 8/2006 | Hatakeyama | |
| 2006/0184791 A1 | 8/2006 | Schain et al. | |
| 2006/0208884 A1 | 9/2006 | Diamant | |
| 2006/0215437 A1 | 9/2006 | Trika et al. | |
| 2006/0225142 A1 | 10/2006 | Moon | |
| 2007/0067644 A1 | 3/2007 | Flynn et al. | |
| 2007/0140477 A1 | 6/2007 | Wise | |
| 2007/0174909 A1 | 7/2007 | Burchett et al. | |
| 2007/0192610 A1 | 8/2007 | Chun et al. | |
| 2007/0204170 A1 | 8/2007 | Oren et al. | |
| 2007/0283140 A1 | 12/2007 | Jones et al. | |
| 2008/0005586 A1 | 1/2008 | Munguia | |
| 2008/0072018 A1 | 3/2008 | Le et al. | |
| 2008/0112405 A1 | 5/2008 | Cholas et al. | |
| 2008/0137848 A1 | 6/2008 | Kocher et al. | |
| 2008/0162848 A1 | 7/2008 | Broyles et al. | |
| 2008/0165952 A1 | 7/2008 | Smith et al. | |
| 2008/0172538 A1 | 7/2008 | Dice et al. | |
| 2008/0184038 A1 | 7/2008 | Fitton | |
| 2008/0276092 A1 | 11/2008 | Eberhardt et al. | |
| 2008/0282345 A1 | 11/2008 | Beals | |
| 2009/0031135 A1 | 1/2009 | Kothandaraman | |
| 2009/0138699 A1 | 5/2009 | Miyazaki et al. | |
| 2009/0150546 A1 | 6/2009 | Ryan | |
| 2009/0150662 A1 | 6/2009 | Desselle et al. | |
| 2009/0154705 A1 | 6/2009 | Price, III et al. | |
| 2009/0172496 A1 | 7/2009 | Roine | |
| 2009/0196418 A1 | 8/2009 | Tkacik et al. | |
| 2009/0259854 A1 | 10/2009 | Cox et al. | |
| 2009/0262940 A1 | 10/2009 | Lim | |
| 2009/0271619 A1 | 10/2009 | Fujii et al. | |
| 2009/0292732 A1 | 11/2009 | Manolescu | |
| 2009/0328201 A1 | 12/2009 | Jin et al. | |
| 2010/0057960 A1 | 3/2010 | Renno | |
| 2010/0064125 A1 | 3/2010 | Liu et al. | |
| 2010/0088739 A1 | 4/2010 | Hall et al. | |
| 2010/0268942 A1 | 10/2010 | Hernandez-Ardieta et al. | |
| 2010/0312940 A1 | 12/2010 | Shinohara | |
| 2011/0012709 A1 | 1/2011 | Payson et al. | |
| 2011/0026831 A1 | 2/2011 | Perronnin et al. | |
| 2011/0095776 A1 | 4/2011 | Yunoki | |
| 2011/0116635 A1 | 5/2011 | Bar-El | |
| 2011/0154501 A1 | 6/2011 | Banginwar et al. | |
| 2012/0246432 A1 | 9/2012 | Hadley et al. | |
| 2013/0024637 A1 | 1/2013 | Hadley | |
| 2013/0024716 A1 | 1/2013 | Hadley | |
| 2013/0027067 A1 | 1/2013 | Schwartz et al. | |
| 2014/0130189 A1 | 5/2014 | Hadley | |
| 2014/0140512 A1 | 5/2014 | Hadley | |
| 2014/0149729 A1 | 5/2014 | Hadley | |
| 2014/0156961 A1 | 6/2014 | Hadley | |
| 2014/0165206 A1 | 6/2014 | Hadley | |

FOREIGN PATENT DOCUMENTS

| | | |
|---|---|---|
| JP | 1201762 | 8/1989 |
| JP | 06028885 | 2/1994 |
| JP | 08069697 | 3/1996 |
| JP | 1131068 | 2/1999 |
| JP | 2008192036 | 8/2008 |
| WO | WO-9745960 | 12/1997 |
| WO | WO-9931665 | 6/1999 |

OTHER PUBLICATIONS

Anderson, R. et al., "Cryptographic Processors—A Survey," Proceedings of the IEEE, vol. 94, No. 2, Feb. 2006, pp. 357-369.

(56) References Cited

OTHER PUBLICATIONS

Bialas; "Intelligent Sensors Security", Sensors, Institute of Innovative Technologies EMAG, 40-189 Katowice, ul. Leopolda 31, Poland, ISSN 1424-8220, Jan. 22, 2010. <www.mdpi.com/journal/sensors>.
D. Ibrahim, "Design of a multichannel temperature data logger with SD card storage," Electronics World, Feb. 2009, <http://www.mikroe.com/downloads/get/789/data_logger_ew_02_09.pdf>.
Datta et al.; "Calibration of On-Chip Thermal Sensors using Process Monitoring Circuits", University of Massachusetts, Amherst, MA USA, IEEE 978-1-4244-6455-5/10, 2010.
Dedrick et al., "An inexpensive, microprocessor-based, data logging system," Computers & Geosciences, 2000, vol. 26, pp. 1059-1066.
Fields, et al; "Cryptographic Key Protection Module in Hardware for the Need2know System", < http://ieeexplore.ieee.org/stamp/stamp.jsp?arnumber=1594225 > On pp. 814-817; vol. 1, Aug. 7-10, 2005.
Gilmont, et al; "An Architecture of Security Management Unit for Safe Hosting of Multiple Agents," < http://citeseerx.ist.psu.edu/viewdoc/summary?doi=10.1.1.21.3663 > On pp. 79-82, 1998.
Hobbizine, "adding memory with i2c eeproms," May 16, 2010, (web page), <http://picaxe.hobbizine.com/eeprom.html>.
International Search Report and Written Opinion received in PCT Application No. PCT/US2011/065081, mailed Jul. 25, 2012, 9 pgs.
International Search Report and Written Opinion received in PCT Application No. PCT/US2011/066750, mailed on Sep. 20, 2012, 10 pgs.
International Search Report and Written Opinion received in PCT Application No. PCT/US2012/020528, mailed Aug. 22, 2012, 9 pgs.
International Search Report and Written Opinion received in PCT Application No. PCT/US2012/023385, mailed May 22, 2012, 10 pgs.
International Search Report and Written Opinion received in PCT Application No. PCT/US2012/023794, mailed Sep. 24, 2012, 9 pgs.
International Search Report and Written Opinion received in PCT Application No. PCT/US2012/024367, mailed Jul. 16, 2012, 10 pgs.
International Search Report and Written Opinion received in PCT Application No. PCT/US2012/031542, mailed Sep. 27, 2012, 9 pgs.
International Search Report and Written Opinion received in PCT Application No. PCT/US2012/065066, mailed Jul. 16, 2012, 9 pgs.
Limor, "Logger Shield: Datalogging for Arduino," (web page), May 17, 2011, <http://www.ladyada.net/make/logshield/index.html>.
Maxim Integrated Products, "DS1678 Real-Time Event Recorder," 2005, <http://datasheets.maximintegrated.com/en/ds/DS1678.pdf>.
Microsoft, "How To: Configure MachineKey in ASP.NET 2.0," available Mar. 9, 2012, <http://msdn.microsoft.com/en-us/library/ff649308.aspx>.
National Institute of Standards and Technology, "Security Requirements for Cryptographic Modules," FIPS PUB 140-2, May 25, 2001, <http://csrc.nist.gov/publications/fips/fips140-2/fips1402.pdf>.
National Institute of Standards and Technology, "Security Requirements for Cryptographic Modules," FIPS PUB 140-3, Draft, p. 16, Sep. 11, 2009, and Annexes A-G <http://csrc.nist.gov/publications/PubsDrafts.html#FIPS-140--3>.
Raafat. S. Habeeb, "Design a Programmable Sequence Controller Utilizing I2C BUS," 2011, Journal of Madenat Alelem College, vol, 3, iss. 2, pp. 5-25, <http://www.iasj.net/iasj?func=fulltext&aId=60778>.
Revolution Education Ltd., "PICAXE Datalogger (AXE110P)," version 2.0, (web page), Dec. 2010, <http://www.picaxe.com/docs/axe110.pdf>.
Sun Microsystems, "Sun Cryptographic Accelerator 4000", Firmware Version 1.1, FIPS 140-2 Non-Proprietary, Security Policy, Level 3 Validation, Aug. 6, 2004, pp. 1-20, Available at: <oracle.com/technetwork/topics/security/140sp457-160924.pdf>.
ViaSat, Inc., "Requirements Description for an Advanced Cryptographic Module (ACM) to Support the High Capacity Communications Capability (HC3)," Technical Report, Oct. 18, 2005, <http://cryptome.org/acm-hc3.htm>.
Yang, et al; "Improving Memory Encryption Performance in Secure Processors", < http://ieeexplore.ieee.org/stamp/stamp.jsp?arnumber=1407851 > On pp. 630-640; vol. 54; Issue: 5, May 2005.
Yao, et al.; "Calibrating On-chip Thermal Sensors in Integrated Circuits: A Design-for-Calibration Approach", Springer Science+Business Media, LLC 2011, Sep. 21, 2011.

\* cited by examiner

STORING EVENT DATA AND A TIME VALUE IN MEMORY WITH AN EVENT LOGGING MODULE

CROSS-REFERENCE TO RELATED APPLICATIONS

This application claims priority to U.S. provisional patent application No. 61/509,078, filed on Jul. 18, 2011, which is hereby incorporated by reference herein in its entirety.

BACKGROUND

A computing device may store in memory information regarding the operation of the computing device. For example, the computing device may store data related to the occurrence of certain events involving the computing device. In some examples, the computing device may store the time of the event along with the data. In such examples, the computing device may access a clock before storing the event data in memory.

BRIEF DESCRIPTION OF THE DRAWINGS

The following detailed description references the drawings, wherein.

DETAILED DESCRIPTION

As noted above, a computing device may store, in memory, data associated with an event involving the computing device along with the time of the event. For example, in response to determining that a predetermined event has occurred, a controller of the computing device (e.g., a microcontroller or other processor) may retrieve a time from a real-time clock of the computing device and then store data associated with the event in memory along with the retrieved time. In some examples, the event data may relate to an event that is potentially significant for diagnosing problems with the operation or use of the computing device.

In some examples, a processor of the computing device that is separate from the controller may also access the real-time clock and the memory. For example, the processor may access the real-time clock to set or read at least one of the time and date of the clock, or to schedule interrupts (e.g., alarms). The processor may access the memory to store or retrieve configuration data. However, accessing the real-time clock and the memory with both the controller and the processor may lead to contention for these components and delay both the controller and the processor, especially when the real-time clock and the memory are on the same bus. In addition to slowing the operation of the computing device, such delays may potentially cause event data to be lost while the controller is waiting to access at least one of the real-time clock and the memory to store time-stamped event data. Such delays may be especially problematic when, for example, the controller has a relatively slow operating speed, or the real-time clock and the memory share a relatively slow bus.

To address these issues, examples disclosed herein include an event logging module comprising event command storage to receive an event command from a controller, clock command storage to receive a clock command from a processor, and memory command storage to receive a memory command from the processor. In such examples, a command manager of the event logging module may access at least one of the real-time clock and the memory in response to each of the received commands. In such examples, the command manager may arbitrate between commands pending concurrently at the event logging module. In this manner, the event logging module may relieve the controller and the processor of the delays associated with waiting for access to at least one of the real-time clock and the memory. Additionally, in some examples, the event logging module may include separate interfaces for the controller and the processor, which may allow the controller and the processor to concurrently provide commands to the event logging module. In such examples, these concurrent commands may be stored in the command storage of the event logging module.

Figure 1:
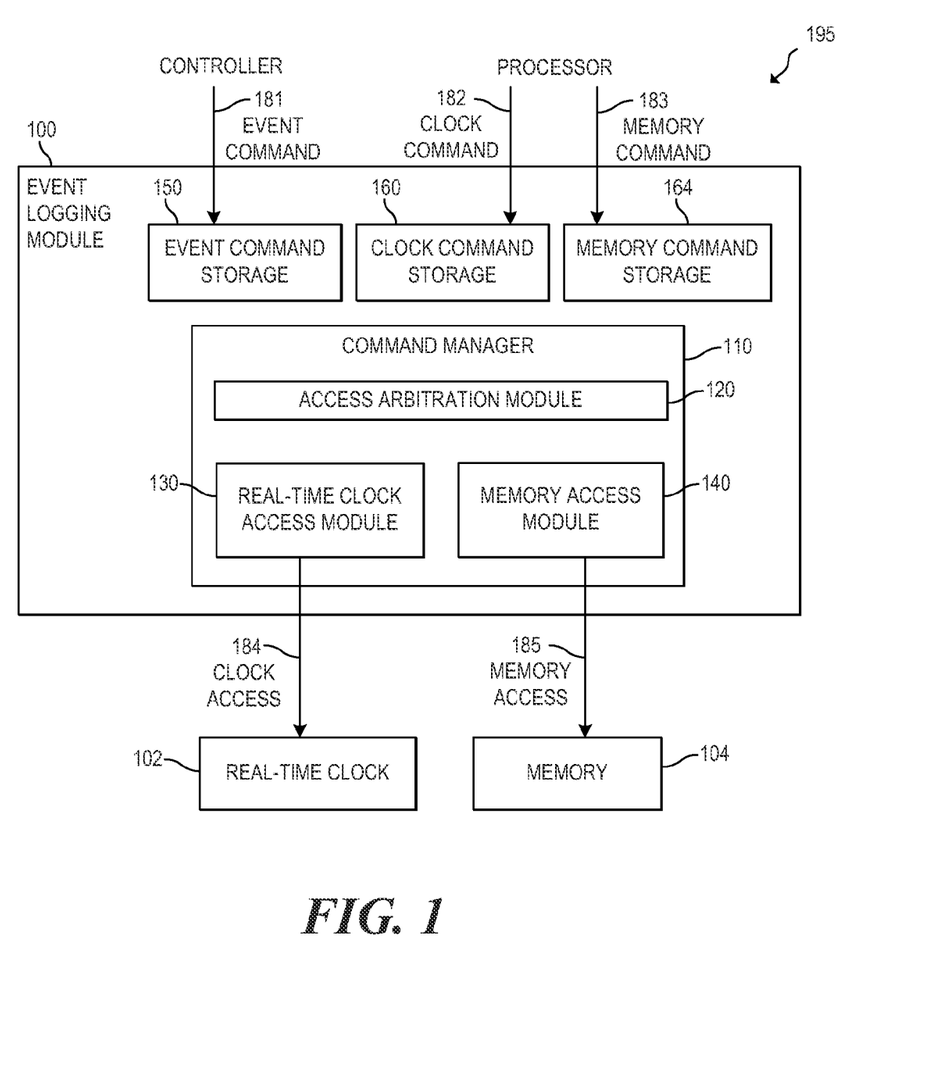
FIG. 1 is a block diagram of a portion of an example computing device including an event logging module.

Referring now to the drawings, FIG. 1 is a block diagram of a portion of an example computing device 195 including an event logging module 100. As used herein, a "computing device" may be a desktop or notebook computer, a tablet computer, a computer networking device (e.g., a hardware security module), a server, or any other device or equipment (e.g., an automated teller machine (ATM), etc.) including a processor. In the example of FIG. 1, computing device 195 may further include a real-time clock 102, a memory 104, a processor, and a controller separate from the processor. Event logging module 100 may include a command manager 110 comprising an access arbitration module 120, a real-time clock access module 130, and a memory access module 140.

In the example of FIG. 1, event logging module 100 may also include event command storage 150, clock command storage 160, and memory command storage 164. As used herein, "storage" may be any type of memory, buffer, or other electronic circuitry for storing data in any suitable format. For example, any storage described herein may be any of Random Access Memory (RAM), flash memory, and the like, or a combination thereof. Additionally, as used herein, "command storage" may be a computing device component comprising storage and control logic to perform the functionalities described herein in relation to command storage. For example, the command storage control logic may output alerts and commands stored therein, as described herein. In some examples, the control logic may be implemented in the form of electronic circuitry, executable instructions encoded on a machine-readable storage medium, or a combination thereof.

In some examples, event command storage 150 may receive, from the controller, an event command 181 including event data. Event command storage 150 may store the received event command 181. In examples described herein, in addition to event data, event commands may include one or more of a bus address of the memory at which to store the event data, and a memory address at which to store the event data. In some examples, event command storage 150 may store a plurality of event commands 181 received from the controller. The event command 181 received from the controller may be a command or request to store the event data in the memory 104 with a time value. Memory 104 may be any type of electronic circuitry or other electronic device for storing data in any suitable format. In some examples, memory 104 may be electrically erasable and programmable read-only memory (EEPROM), flash memory, or any other suitable type of non-volatile memory. Additionally, memory 104 may be external to event logging module 100. In some examples, memory 104 may be separate from a chip (e.g., an integrated circuit (IC)) including event logging module 100.

In the example of FIG. 1, clock command storage 160 may receive a clock command 182 from the processor of computing device 195, and may store the received clock command 182. In examples described herein, clock commands may include one or more of a bus address of a clock to access, and a memory address at which to access the clock (e.g., read or write data). In some examples, clock command storage 160 may store a plurality of clock commands 182 received from the processor. Each clock command 182 may be any type of command for real-time clock 102, such any type of input/output (I/O) command (e.g., a read or write command) for real-time clock 102. As used herein, a "real-time clock" is a time keeper to maintain at least one of a time and date relative to an initial value. In some examples, a real-time clock may include logic implemented on an IC and a resonating element separate from the IC, where the IC logic interacts with the resonating element to maintain at least one of a time and date relative to an initial value (e.g., a value to which the real-time clock was initialized). In some examples, the resonating element may be a crystal oscillator, such as a quartz crystal oscillator.

Additionally, memory command storage 164 may receive a memory command 183 from the processor of computing device 195, and may store the received memory command 183. In examples described herein, memory commands may include one or more of a bus address of the memory, and a memory address at which to access the memory. Memory command storage 164 may store a plurality of clock commands 183 received from the processor. Each memory command 183 may be any type of command for memory 104, such as any type of I/O command for memory 104 (e.g., a read or write command). In some examples, event logging module 100 may include a controller interface and a separate processor interface. In such examples, the event command storage may receive commands from the controller via the controller interface, and the clock and memory command storage may each receive commands from the processor via the processor interface. In such examples, the controller and the processor may provide commands to event logging module 100 concurrently.

As used herein, a "processor" may be at least one of a central processing unit (CPU), a semiconductor-based microprocessor, a field-programmable gate array (FPGA) configured to retrieve and execute instructions stored on a machine-readable storage medium, other electronic circuitry suitable for the retrieval and execution of such instructions, or a combination thereof. Additionally, as used herein, a "controller" may be at least one of a processor, a microcontroller, other electronic circuitry suitable for the retrieval and execution of instructions stored on a machine-readable storage medium, or a combination thereof. In some examples, the processor of computing device 195 may include a main CPU core of a microprocessor including the controller. In such examples, the controller may be a microcontroller to perform a plurality of specialized tasks such as monitoring the physical security of computing device 195 and storing event data in memory 104 of computing device 195. In some examples, the event data may relate to the security of computing device 195, the operation of certain components of computing device 195 (e.g., cryptographic components), or any other event that is potentially significant for diagnosing problems with one or more of the development, testing, operation and use of computing device 195.

In the example of FIG. 1, the processor and the controller may each provide, to event logging module 100, commands involving access at least one of real-time clock 102 and memory 104. For example, the processor may provide clock commands 182 to access real-time clock 102 to set or read at least one of a time and date of clock 102, or to schedule interrupts (e.g., alarms). The processor may provide memory commands 183 to access memory 104 to read and write configuration data for the microprocessor. Additionally, the controller may provide event commands 181 to cause event logging module 100 to store event data in memory 104 with a time value retrieved from real-time clock 102.

In the example of FIG. 1, in response to an event command 181 received at event command storage 150, command manager 110 may retrieve a time value from real-time clock 102 and store event data of the event command 181 in memory 104 along with the value time retrieved from real-time clock 102. In some examples, access arbitration module 120 may coordinate an event logging operation in response to an event command 181 stored in event command storage 150. For example, when event command storage 150 receives event command 181, event command storage 150 may provide an alert to command manager 110 to indicate that event command storage 150 is not empty. In response to the alert, module 120 may provide a read command to real-time clock access module 130 to cause module 130 to retrieve a time from real-time clock 102. In such examples, module 130 may retrieve a time value by providing the read command to real-time clock 102 via a clock access communication 184. Real-time clock 102 may return the time value to module 130 in response to communication 184. Clock access communication 184 may be any type of I/O command for real-time clock 102. As used herein, a "time value" may be a value in any suitable format indicating at least one of a year, month, day, hour, minute, second, and fraction of a second in which a real-time clock was accessed.

Module 120 may also, in response to the alert from event command storage 150, instruct event command storage 150 to store at least the event data of event command 181 in memory access module 140. Additionally, module 130 may provide the retrieved time value to module 140. In such examples, module 140 may store the event data, along with the retrieved time value, in memory via a memory access communication 185, such as a write command. In the example of FIG. 1, memory access communication 185 may be any type of I/O command for memory 104.

In the example of FIG. 1, command manager 110 may access real-time clock 102 in response to a clock command 182 received at clock command storage 160. For example, after receiving and storing a clock command 182, clock command storage 160 may provide an alert to command manager 110 to indicate that clock command storage 160 is not empty. In response to the alert, module 120 may instruct clock command storage 160 to provide the clock command 182 to module 130. In response, module 130 may provide the clock command 182 to real-time clock 102 via a clock access communication 184. In some examples, clock command 182 may be a write command. In such examples, the write command may write to real-time clock 102 to set at least one of a time and date of real-time clock 102. In other examples, the write command may write to real-time clock 102 to schedule a time for real-time clock 102 to provide an interrupt to the processor.

Additionally, command manager 110 may access memory 104 in response to a memory command 183 received at memory command storage 164. For example, after receiving and storing a memory command 183, memory command storage 164 may provide an alert to command manager 110 to indicate that memory command storage 164 is not empty. In response to the alert, module 120 may instruct memory command storage 164 to provide the memory command 183 to module 140. In response, module 140 may provide the memory command 183 to memory 104 via a memory access communication 185. In some examples, memory command 183 may be a read or write command. In such examples, memory command 183 may be a command to write configuration data to, or read configuration data from, memory 104.

In the example of FIG. 1, module 120 may arbitrate access to real-time clock 102 and memory 104 between event commands 181, clock commands 182, and memory commands 183. For example, module 120 may arbitrate access to real-time clock 102 between an event command 181 and a clock command 182, if the event command 181 and the clock command 182 are pending concurrently. As used herein, commands are "pending concurrently" if each of the commands has been received by command storage of an event logging module and command processing has not been completed for any of the commands. In some examples, an event command is completed when memory 104 is available after being accessed by command manager 110 in response to the event command. Additionally, in some examples, a clock command is completed when real-time clock 102 is available after being accessed by command manager 110 in response to the clock command. In some examples, a memory command is completed when memory 104 is available after being accessed by command manager 110 in response to the memory command.

In some examples, an event command 181 and a clock command 182 may be pending concurrently when the event command 181 is stored in event command storage 150, and the clock command 182 is concurrently stored in clock command storage 160. In such examples, module 120 may arbitrate access to real-time clock 102 by selecting the event command 181 for processing and allowing the clock command 182 to remain in clock command storage 160 until real-time clock 102 is available after being accessed in response to event command 181. In some examples, module 120 may give priority to event commands 181 stored in event command storage 150 over clock commands 182 stored in clock command storage 160. In other examples, module 120 may select among the commands by alternating between commands stored in event command storage 150 and those stored in clock command storage 160.

In other examples, an event command 181 and a clock command 182 may be pending concurrently if the event command 181 is being processed when the clock command 182 is received at clock command storage 160. In such examples, module 120 may allow the clock command 182 to remain in clock command storage 160 until real-time clock 102 is available after being accessed in response to event command 181. In still other examples, an event command 181 and a clock command 182 may be pending concurrently if the clock command 182 is being processed when the event command 181 is received at event command storage 150. In such examples, module 120 may allow the event command 181 to remain in event command storage 150 until real-time clock 102 is available after being accessed in response to the clock command 182, since processing an event command 182 involves accessing both real-time clock 102 and memory 104.

In the example of FIG. 1, module 120 may also arbitrate access to memory 104 between an event command 181 and a memory command 183, if the event command 181 and the memory command 183 are pending concurrently. In some examples, an event command 181 and a memory command 183 may be pending concurrently when the event command 181 and the memory command 183 are concurrently stored in event command storage 150 and memory command storage 164, respectively. In some examples, module 120 may give priority to event commands 181 stored in event command storage 150 over memory commands 183 stored in memory command storage 164. In such examples, module 120 may arbitrate access to memory 104 by selecting the event command 181 for processing and allowing the memory command 183 to remain in memory command storage 164 until memory 104 is available after being accessed in response to event command 181. In other examples, module 120 may select among the commands by alternating between commands stored in event command storage 150 and those stored in memory command storage 164. In some examples, module 120 may select among command stored in command storage by alternating between commands received from the controller (i.e., stored in event command storage 150) and commands received from the processor (i.e., stored in clock command storage 160 or memory command storage 164).

In other examples, an event command 181 and a memory command 183 may be pending concurrently if the event command 181 is being processed when the memory command 183 is received at memory command storage 164. In such examples, module 120 may allow the memory command 183 to remain in memory command storage 164 until memory 104 is available after being accessed in response to event command 181. In still other examples, an event command 181 and a memory command 183 may be pending concurrently if the memory command 183 is being processed when the event command 181 is received at event command storage 150. In such examples, module 120 may allow the event command 181 to remain in event command storage 150 until memory 104 is available after being accessed in response to the memory command 183.

In some examples, the functionalities of modules 110, 120, 130, and 140 may be implemented in the form of electronic circuitry, in the form of executable instructions encoded on a machine-readable storage medium, or a combination thereof. As used herein, a "machine-readable storage medium" may be any electronic, magnetic, optical, or other physical storage device to contain or store information such as executable instructions, data, and the like. For example, any machine-readable storage medium described herein may be any of RAM, flash memory, a storage drive (e.g., a hard disk), a Compact Disc Read Only Memory (CD-ROM), and the like, or a combination thereof. Further, any machine-readable storage medium described herein may be non-transitory.

In examples described above, a processor and controller of a computing device may each access a real-time clock and a memory of a computing device via an event logging module. In such examples, the event logging module may store commands received from the processor and the controller, and arbitrate access to the real-time clock and the memory in response to the stored commands. In such examples, the controller and the processor may each provide a command to the event logging module and then continue with other operations without waiting to access a shared resource. In this manner, examples described herein may enable the processor and the controller to offload to the event logging module delays otherwise involved in sharing access to the real-time clock and the memory, and the delays of event logging operations involving both real-time clock and memory access. Additionally, by providing command storage and separate interfaces for the controller and the processor, the controller and the processor may provide commands to the event logging module concurrently in examples described herein.

Figure 2:
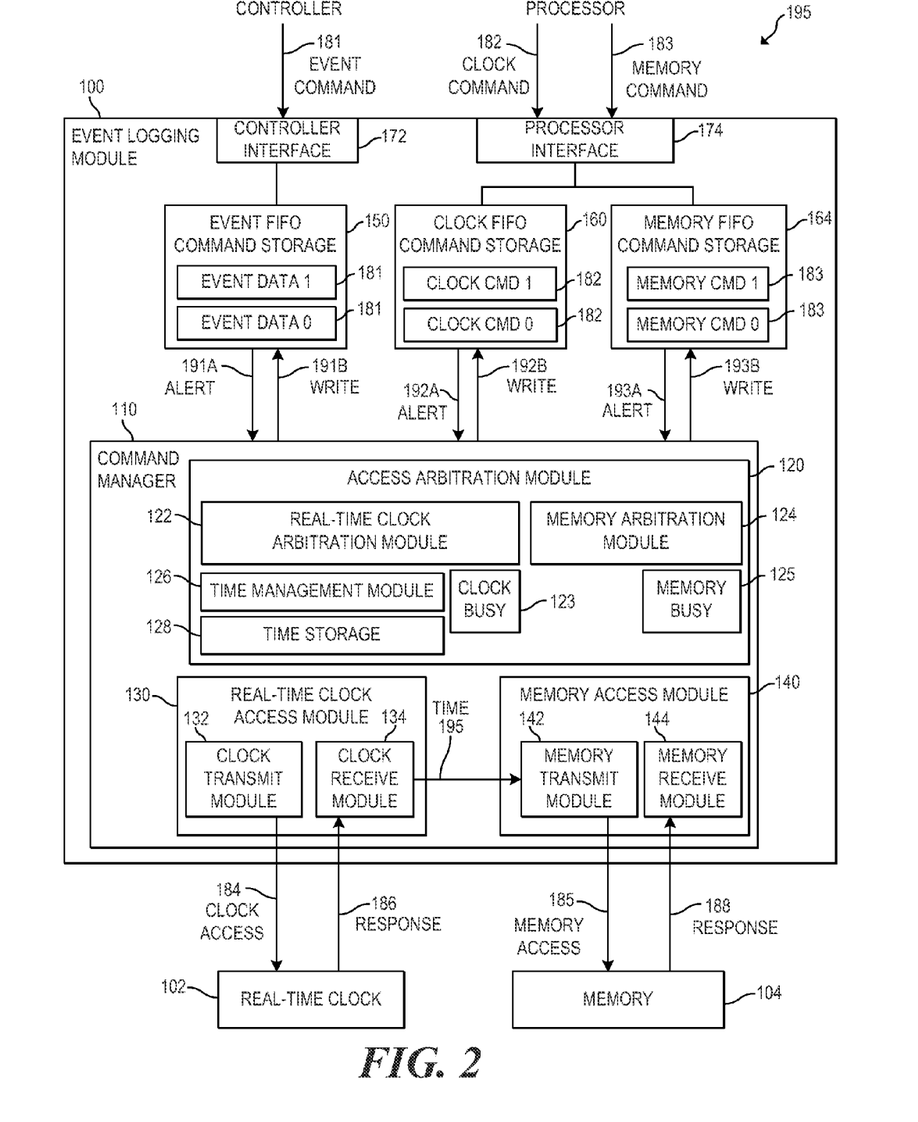
FIG. 2 is a block diagram of a portion of an example computing device including an event logging module comprising event, clock, and memory command storage.

FIG. 2 is a block diagram of a portion of an example computing device 195 including an event logging module comprising event, clock, and memory command storage. In the example of FIG. 2, computing device 195 includes a controller, a processor, an event logging module 100, a real-time clock 102, and a memory 104, as described above in relation to FIG. 1. Event logging module 100 includes event command storage 150, clock command storage 160, memory command storage 164, and a command manager 110, as described in above relation to FIG. 1. In the example of FIG. 2, command manager 110 may include access arbitration module 120, real-time clock access module 120, and memory access module 140, as described above in relation to FIG. 1.

In the example of FIG. 2, event logging module 100 also includes a controller interface 172 and a processor interface 174 separate from controller interface 172. In such examples, the controller may interact with event logging module 100 via controller interface 172, and the processor may interact with event logging module 100 via processor interface 174. In such examples, the controller and the processor may each interact with event logging module 100 regardless of any concurrent interaction between the other and the event logging module 100. For example, interfaces 172 and 174 may allow the controller and the processor to provide commands to event logging module 100 concurrently. In such examples, event command storage 150 may receive event commands 181 via controller interface 172. Additionally, clock command storage 160 may receive clock commands 182 via processor interface 174, and memory command storage 164 may receive memory commands 183 via processor interface 174. In such examples, processor interface 174 may forward received commands to the appropriate command storage.

In the example of FIG. 2, each of event command storage 150, clock command storage 160, and memory command storage 164 may be first-in-first-out (FIFO) command storage. As used herein, "FIFO command storage" is command storage that stores commands in a first-in-first-out manner. In some examples, the FIFO functionalities of the FIFO command storage may be implemented by the control logic of the command storage. Additionally, in some examples, FIFO command storage may implemented in the form of dual-port random access memory (RAM), for example.

In such examples, event FIFO command storage 150 may store a plurality of event commands 181. Each of these event commands 181 may be stored in event FIFO command storage 150 until respectively selected for processing by command manager 110. Additionally, clock FIFO command storage 160 may store a plurality of event commands 182, each of which may be stored in clock FIFO command storage 160 until respectively selected for processing by command manager 110. Similarly, memory FIFO command storage 164 may store a plurality of event commands 183, each of which may be stored in memory FIFO command storage 164 until respectively selected for processing by command manager 110.

In the example of FIG. 2, command storage 150, command storage 160, and command storage 164 may each provide an alert to command manager 110 when it is not empty. In such examples, command storage 150 may provide an alert 191A to command manager 110 when it is not empty. For example, command storage 150 may provide alert 191A in response to receiving an event command 181, if no other event command is stored therein, or after removing an event command 181 from command storage 150, if at least one other event command 181 is stored in command storage 150. Similarly, command storage 160 may provide an alert 192A to command manager 110 when it is not empty, and command storage 164 may provide an alert 193A to command manager 110 when it is not empty. In such examples, alerts 191A, 192A, and 193A may indicate to command manager 110 that commands are waiting to be processed.

As described above in relation to FIG. 1, module 120 may arbitrate access to real-time clock 102 and memory 104 between event commands 181, clock commands 182, and memory commands 183. In the example of FIG. 2, access arbitration module 120 includes a real-time clock arbitration module 122, a memory arbitration module 124, and a time management module 126. Module 120 may further include clock busy storage 123, memory busy storage 125, and time storage 128. In some examples, a busy value may be stored in storage 123 when the clock is busy, and a free value may be stored in storage 123 when the clock is available for access. Similarly, the busy value may be stored in memory busy storage 125 when the memory is busy, and the free value may be stored in storage 125 when the memory is available for access. In examples described herein, the busy value may be any information, such as a data value, bit pattern, etc., and the free value may be any information different than the busy value. For example, the busy value may be a "1" while the free value is a "0", or vice versa.

Additionally, in the example of FIG. 2, module 130 may include a clock transmit module 132 and a clock receive module 134, and module 140 may include a memory transmit module 142 and a memory receive module 144. In some examples, the functionalities of modules 110, 120, 122, 124, 126, 130, 132, 134, 140, 142, and 144 may be implemented in the form of electronic circuitry, in the form of executable instructions encoded on a machine-readable storage medium, or a combination thereof. In some examples, at least one of modules 132, 134, 142, and 144 may include storage.

In the example of FIG. 2, module 120 of command manager 110 may access real-time clock 102 and memory 104 in response to an event command 181. In some examples, module 120 may access clock 102 and memory 104 in response to the event command 181 after receiving an alert 191A indicating the presence of event command 181 in command storage 150. In such examples, in response to an event command 181, module 122 may provide a clock read command to clock transmit module 132 when module 122 determines that the free value is stored in clock busy storage 123. In response, module 132 may provide the clock read command to real-time clock 102 via a clock access communication 184, and module 130 may store the busy value in clock busy storage 123.

In response to the read command, real-time clock 102 may return a time value 195 in a response communication 186, which may be received by clock receive module 134. Module 134 may then store the free value in storage 123 and provide the time value 195 to memory transmit module 142 when the free value is stored in storage 125. In some examples, communication 186 may comprise a packet including time value 195 in a binary-coded decimal format. In some examples, a modified (e.g., permuted, reformatted, etc.) version of time value 195 may be stored in module 142. In such examples, the format of time value 195 may be modified by the connection between modules 134 and 142 or by a separate formatting module. In such examples, the modification of time value 195 may include rearranging data, adding data, deleting data, or a combination thereof.

Also in response to event command 181, module 124 may provide a write communication 191B to command storage 150 to instruct command storage 150 to provide the next event command 181 in the FIFO command storage 150 to memory transmit module 142, when module 124 determines that the free value is stored in storage 125. Module 142 may then provide the received event command 181 and time value 195 to memory 104 via a memory access communication 185. The event command 181 may be a write command for memory 104. In such examples, in response to communication 185, memory 104 may write event data included in event command 181 along with the time value 195. In this manner, command manager 110 may access real-time clock 102 and memory 104 to store event data with a time value in memory 104 in response to an event command 181. Module 140 may then store the free value in memory busy storage 125.

In some examples, module 120 may give priority to event commands 181, and select event commands 181 for processing over both clock commands 182 and memory commands 183. In such examples, in response to an alert 191A, module 120 may cause command manager 110 to access real-time clock 102 and memory 104 in response to each event command 181 stored in event FIFO command storage 150, regardless of whether any command is stored in clock FIFO command storage 160 or memory FIFO command storage 164. In this manner, module 120 may select received event commands 181 for processing over received clock and memory commands 182 and 183.

In such examples, command manager 110 may access real-time clock 102 in response to a clock command 182 stored in command storage 160 if no event command 181 is stored in event command storage 150. For example, module 120 may select a clock command 182 for processing if no event command 181 is stored in command storage 150. In such examples, in response to an alert 192A, module 122 may select a clock command 182 stored in command storage 160 for processing if module 122 determines that no event command 181 is stored in command storage 150, and the free value is stored in clock busy storage 123, indicating that real-time clock 102 is available for access. In response to the determination, module 122 may provide a write communication 192B to command storage 160 to instruct the FIFO command storage 160 to provide the next clock command 182 stored therein to clock transmit module 132. Module 132 may then provide the received clock command 182 to real-time clock 102 via a clock access communication 184 and store the busy value in clock busy storage 123.

If the clock command 182 is a write command, then module 140 may store the free value in storage 123 in response to an acknowledgement that the write has been completed. If the clock command 182 is a read command, then real-time clock 102 may respond with a response 186, such as a time value, which may be received by module 134. Module 134 may store the free value in storage 123 when it receives response 186. In some examples, processor may access module 134 via interface 174 to read the retrieved time value. In some examples, time management module 126 may store the most recently retrieved time value in time storage 128. In such examples, each time a new time value is retrieved from real-time clock 102, module 126 may compare the new time value to the stored time value to determine whether a clock incident has occurred. For example, module 126 may determine that a clock incident has occurred if the new time value is earlier than the time value stored in storage 128, indicating that the time keeping of real-time clock 102 is erroneous. In such examples, if module 126 determines that no clock incident has occurred, then module 126 may store the new time value in storage 128 to replace the previously stored time value. As used herein, a "clock incident" is at least one event causing a real-time clock to fail to maintain at least one of the present time and date accurately. In some examples, a clock incident may result from an actual or attempted tampering with real-time clock 102, such as an actual or attempted tampering with a crystal oscillator of real-time clock 102, for example.

In some examples, command manager 110 may also access memory 104 in response to a memory command 183 stored in command storage 164 if no event command 181 is stored in event command storage 150. For example, module 120 may select a memory command 183 for processing if no event command 181 is stored in command storage 150. In such examples, in response to an alert 193A, module 124 may select a memory command 183 stored in command storage 164 for processing if module 124 determines that no event command 181 is stored in command storage 150, and the free value is stored in memory busy storage 125, indicating that memory 104 is available for access. In response to the determination, module 124 may provide a write communication 193B to command storage 164 to instruct the FIFO command storage 164 to provide the next memory command 183 stored therein to memory transmit module 142. Module 142 may then provide the received memory command 183 to memory 104 via a memory access communication 185. If the memory command 183 is a read command, then memory 104 may respond with a response 188, such as data stored at an address specified in the read command. Response 188 may be received by module 144, which processor may access via processor interface 174. Module 144 may store the free value in storage 144 when it receives response 188.

Additionally, in the example of FIG. 2, command manager 110 may delay the processing of an event command 181 received at command storage 150, if it is received while command manager 110 is processing a clock command 182 or a memory command 183. For example, module 120 may allow the event command 181 to remain in command storage 150 until both real-time clock 102 and memory 104 are available for access, since command manager 110 accesses both real-time clock 102 and memory 104 to process an event command 181. For example, module 120 may allow the event command 181 to remain in command storage if a busy value is stored in at least one of storage 123 and storage 125.

In such examples, if both real-time clock 102 and memory 104 are available for access, then command manager 110 may access real-time clock 102 and memory 104 in response to the event command 181, as described above. In such examples, module 120 may determine that real-time clock 102 and memory 104 are both available when the free value is stored in both storage 123 and storage 125. In some examples, command manager 110 may delay an event command 181 until both real-time clock 102 and memory 104 are available for access if command manager 110 (i.e., event logging module 100) accesses real-time clock 102 and memory 104 via the same bus.

In other examples, command manager 110 (i.e., event logging module 100) may access real-time clock 102 and memory 104 via different buses. In such examples, command manager 110 may access real-time clock 102 in response to an event command 181 if real-time clock 102 is available, regardless of whether memory 104 is available. For example, command manager 110 may access real-time clock 102 in response to an event command 181 while command manager 100 is processing a memory command 183. In such examples, command manager 110 may retrieve a time value from real-time clock 102 in response to event command 181, as described above, when a free value is stored in storage 123 and a busy value is stored in storage 125. In such examples, command manager 110 may access memory 104 in response to event command 181 when the free value is stored in storage 125 (e.g., when command manager 110 completes processing the memory command 183). In some examples, functionalities and components described herein in relation to FIGS. 1-2 may be provided in combination with functionalities and components described herein in relation to any of FIGS. 3-5.

Figure 3:
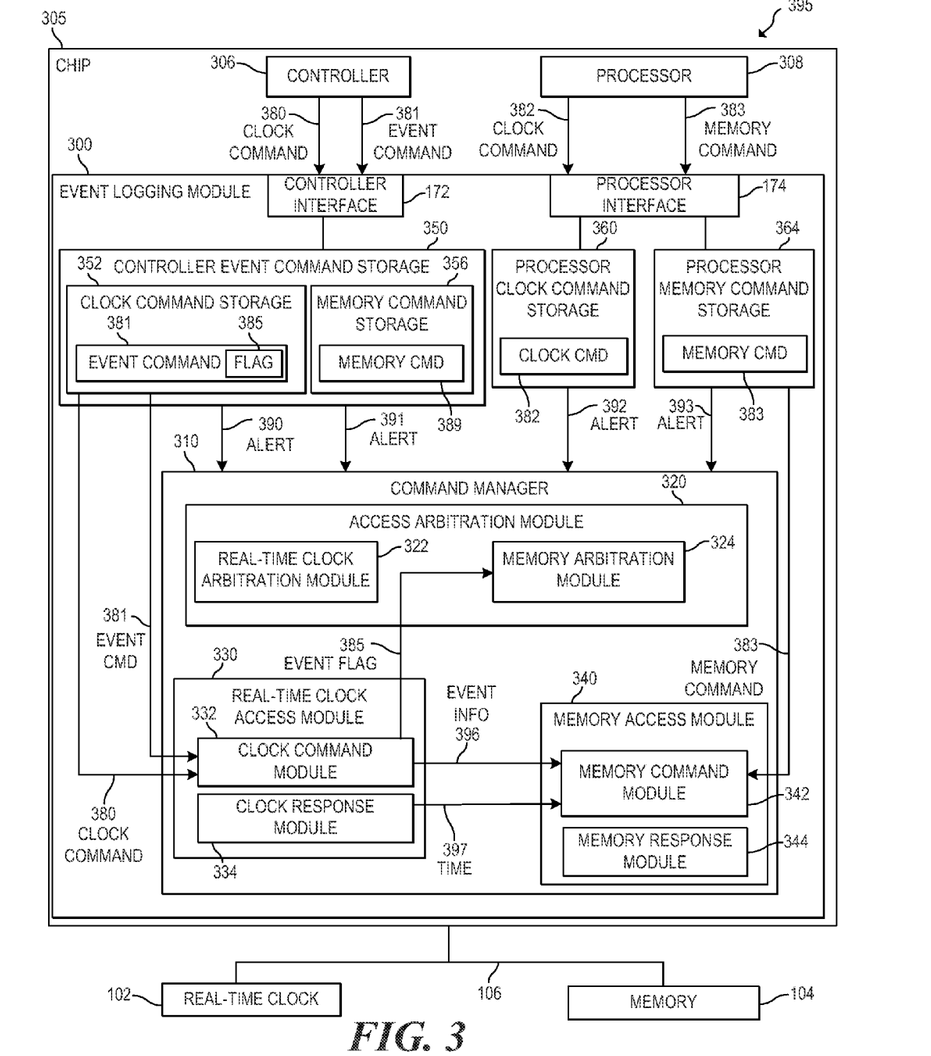
FIG. 3 is a block diagram of a portion of an example computing device including a processor, a controller, and an event logging module.

FIG. 3 is a block diagram of a portion of an example computing device 395 including a processor, a controller, and an event logging module. In the example of FIG. 3, computing device 395 includes a real-time clock 102 and a memory 104, as described above in relation to FIG. 1. In some examples, clock 102 and memory 104 may be connected to chip 305 via a single bus 106. In other examples, clock 102 and memory 104 may be connected to chip 305 via separate buses 106. In some examples, each bus 106 may be an inter-integrated circuit (IIC) bus, a serial peripheral interface (SPI) bus, or another kind of bus. Computing device 395 further includes a chip 305, such as an IC, a microchip, or another type of electronic circuit. Chip 305 comprises an event logging module 300, a controller 306, and a processor 308.

Event logging module 300 may include a controller interface 172 and a separate processor interface 174, as described above in relation to FIG. 2. In the example of FIG. 3, controller 306 may provide controller event commands 381 to controller interface 172 of event logging module 300. In addition, processor 308 may provide both processor clock commands 382 and processor memory commands 383 to processor interface 174 of event logging module 300. In such examples, because of the separate interfaces for controller 306 and processor 308, controller 306 may provide controller event commands 381 to event logging module 300 regardless of any concurrent interaction between processor 308 and event logging module 300. Similarly, processor 308 may provide clock commands 382 and memory commands 383 to event logging module 300 regardless of any concurrent interaction between controller 306 and event logging module 300.

In the example of FIG. 3, event logging module 300 may include controller event command storage 350, processor clock command storage 360, and processor memory command storage 364. Controller event command storage 350 may receive controller event commands 381 via controller interface 172 and store the received commands 381. As used herein, a "controller event command" is an event command output by a controller.

In the example of FIG. 3, command storage 350 comprises controller clock command storage 352 and controller memory command storage 356. In such examples, each of command storage 352 and command storage 356 may be FIFO command storage or any other suitable command storage. In some examples, command storage 352 may receive controller clock commands 380 and controller event commands 381 from controller 306 and stored the received commands. As used herein, a "controller clock command" is a clock command output by a controller. In some examples, command storage 356 may receive controller memory commands 389 from controller 306 and stored the received commands 389. As used herein, a "controller memory command" is a memory command output by a controller. In other examples, command storage 350 may include one command storage (e.g., one FIFO command storage) to receive event commands 381, as described above in relation to event command storage 150.

Processor clock command storage 360 may receive processor clock commands 382 via controller interface 174 and store the received commands 382. Processor memory command storage 364 may receive processor memory commands 383 via controller interface 174 and store the received commands 383. In some examples, each of command storage 360 and command storage 364 may be FIFO command storage or any other suitable command storage. As used herein, a "processor clock command" is a clock command output by a processor, and a "processor memory command" is a memory command output by a processor.

Event logging module 300 further includes a command manager 310. Command manager 310 may include an access arbitration module 320 comprising a real-time clock arbitration module 322 and a memory arbitration module 324. Command manager 310 may also include a real-time clock access module 330 and a memory access module 340. In some examples, module 330 includes a clock command module 332 and a clock response module 334, and module 340 includes a memory command module 342 and a memory response module 344.

In the example of FIG. 3, command manager 310 may, in response to a controller event command 381 including event data, retrieve a time value from real-time clock 102 and store the event data with the retrieved time value in memory 104. For example, controller clock command storage 352 may provide an alert 390 to command manager 310 if command storage 352 is not empty, such as when a controller event command 381 is stored therein. In response, arbitration module 322 may instruct controller clock command storage 352 to provide the controller event command 381 to clock command module 332 of clock access module 330. In some examples, the controller event command 381 may include event data, a clock read command, a memory address, and an event flag 385. In such examples, the event flag 385 may indicate to arbitration module 320 that command 381 is an event command. In some examples, the event flag 385 may be, for example, a predefined logic value (e.g., a "1" or a "0") at a reserved bit of the command 381.

In response to the event command 381, clock command module 332 may provide the clock read command included in event command 381 to real-time clock 102. In response to the read command, real-time clock 102 may return a time value, which may be received by clock response module 334. In response to the event command 381, clock command module 332 may further inform memory arbitration module 324 that the command 381 includes an event flag 385, indicating that the command 381 is an event command. In response, module 324 may cause event information 396 in clock command module 332 and the retrieved time value 397 in clock response module 334 to each be copied to memory command module 342. In such examples, the event information 396 may include the event data and the memory address included in the event command 381. In response, memory command module 342 may store the event data and the retrieved time value 397 at the specified memory address of memory 104. In some examples, module 320 may select an event command 381 for processing in response to alert 390 when real-time clock 102 and memory 104 are available, or when real-time clock 102 is available, as described above in relation to FIG. 2.

In the example of FIG. 3, command manager 310 may access real-time clock 102 in response to a processor clock command 380 received at command storage 352. For example, command storage 352 may provide an alert 390 to command manager 310 if command storage 352 is not empty. In response, arbitration module 322 may instruct command storage 352 to provide the clock command 380 to clock command module 332 when real-time clock 102 is available. In some examples, module 320 may also load identification data (e.g., a bit) into module 332 to indicate whether a command provided to module 332 is from controller 306 or processor 308. After receiving the command 380, module 332 may provide the command 380 to real-time clock 102, and clock response module 334 may receive any response of real-time clock 102 (e.g., a time value in response to a read command). If module 334 receives a response, then module 334 may indicate to module 322 that it has received a response, and processor 308 may read the response from module 334. In some examples, the identification data may indicate to controller 306 and processor 308 whether it is to retrieve the response. In some examples, module 334 may also be divided into portions for controller 306 and processor 308, respectively. In such examples, a response of clock 102 may be stored in the appropriate portion based on the identification data. Additionally, since it is not an event command, clock command 380 does not include an event flag 385, so memory arbitration module does not copy any information from clock access module 330 to memory access module 340 to cause a memory access.

In some examples, command manager 310 may also access real-time clock 102 in response to a processor clock command 382 received at command storage 360. For example, command storage 360 may provide an alert 392 to command manager 310 if command storage 360 is not empty. In response, arbitration module 322 may instruct command storage 360 to provide the clock command 382 to clock command module 332 when real-time clock 102 is available. In response, module 332 may provide command 382 to real-time clock 102. Clock response module 334 may receive any response of real-time clock 102 and may indicate the receipt of any response to module 322. Processor 308 may read any response of real-time clock 102 from module 334.

In such examples, real-time clock access module 330 may access real-time clock 102 in response to either of a controller clock command 380 received by command storage 350 and a processor clock command 382 received by command storage 360. In some examples, if commands are stored in both controller clock command storage 352 and processor clock command storage 360, arbitration module 322 of command manager 310 may alternate between selecting, for provision to clock access module 330, a command stored in command storage 352 (e.g., an event command 381 or clock command 380) and a command stored in command storage 360 (e.g., a clock command 382). In other examples, module 322 may give priority to event commands 381 having event flag 382 and select event commands 381 over both controller clock commands 380 and processor clock commands 382.

In the example of FIG. 3, command manager 310 may also access memory 104 in response to a processor memory command 383 received at command storage 364. For example, command storage 364 may provide an alert 393 to command manager 310 if command storage 364 is not empty. In response, arbitration module 324 may instruct command storage 364 to provide the memory command 383 to memory command module 342 when memory 104 is available. In some examples, module 320 may also load identification data into module 344 to indicate whether the command is from controller 306 or processor 308. After receiving command 383, module 342 may provide command 383 to memory 104, and memory response module 344 may receive any response of memory 104 (e.g., in response to a read command). If module 344 receives a response, then module 344 may indicate to module 322 that it has received a response, and processor 308 may read the response from module 344. In some examples, the identification data may indicate to controller 306 and processor 308 whether it is to retrieve the response. In some examples, module 344 may also be divided into portions for controller 306 and processor 308, respectively. In such examples, a response of memory 104 may be stored in the appropriate portion based on the identification data.

In some examples, command manager 310 may also access memory 104 in response to a controller memory command 389 received at command storage 356. For example, command storage 356 may provide an alert 391 to command manager 310 if command storage 356 is not empty. In response, arbitration module 324 may instruct command storage 356 to provide the memory command 389 to memory command module 342 when memory 104 is available. Module 342 may provide the command 389 to memory 104, and memory response module 344 may receive any response of memory 104 (e.g., a response to a read command).

In such examples, memory access module 340 may access memory 104 in response to either of a controller memory command 389 received by command storage 350 and a processor memory command 383 received by command storage 364. In some examples, if commands are stored in both controller memory command storage 356 and processor memory command storage 364, arbitration module 324 may alternate between selecting, for provision to memory access module 340, a command stored in command storage 356 (e.g., a memory command 383) and a command stored in command storage 364 (e.g., a memory command 389).

In some examples, real-time clock 102 and memory 104 are separate from chip 305 including controller 306, processor 308, and event logging module 300. For example, real-time clock 102 may include a crystal oscillator and memory 104 may be EEPROM. In such examples, the fabrication methods used to make real-time clock 102 and memory 104, respectively, may be significantly different than the fabrication methods used to fabricate chip 305 including controller 306, processor 308, and event logging module 300 on a single IC. For example, while chip 305 may be fabricated by a process to provide greater processing speed, EEPROM memory 104 may be fabricated by a process to provide lower power consumption. Additionally, real-time clock 102 may be fabricated by a different process, as it may be impractical to incorporate a crystal oscillator, for example, into the IC of chip 305. As such, real-time clock 102 and memory 104 may be separate from chip 305 in some examples. In such examples, event logging module 300 may provide a single point of access to the off-chip real-time clock 102 and memory 104. In such examples, controller 306 and processor 308 may both access clock 102 and memory 104 without providing separate I/O buses and/or interfaces for controller 306 and processor 308. In examples described here, delays involved with accessing off-chip components may be absorbed by event logging module 300 rather than delaying the operation of controller 306 and processor 308. In some examples, chip 305 may be a microprocessor in which processor 308 is the main CPU core for the microprocessor, controller 306 is a microcontroller to manage security of the computing device 395, and the microprocessor including processor 308, controller 306, and event logging module 300 are all disposed in one IC (e.g., chip 305). Additionally, in examples in which the crystal oscillator of real-time clock 102 is separate from chip 305, real-time clock 102 may be vulnerable to clock incidents, such as attacks on clock 102. In such examples, it may be beneficial to detect clock incidents involving real-time clock 102.

In some examples, the functionalities of command manager 310 and modules 320, 322, 324, 330, 332, 334, 340, 342, and 344 may be implemented in the form of electronic circuitry, in the form of executable instructions encoded on a machine-readable storage medium, or a combination thereof. Additionally, in some examples, at least one of modules 332 and 342 may include storage. In some examples, functionalities and components described herein in relation to FIG. 3 may be provided in combination with functionalities and components described herein in relation to any of FIGS. 1-2 and 4-5.

Figure 4:
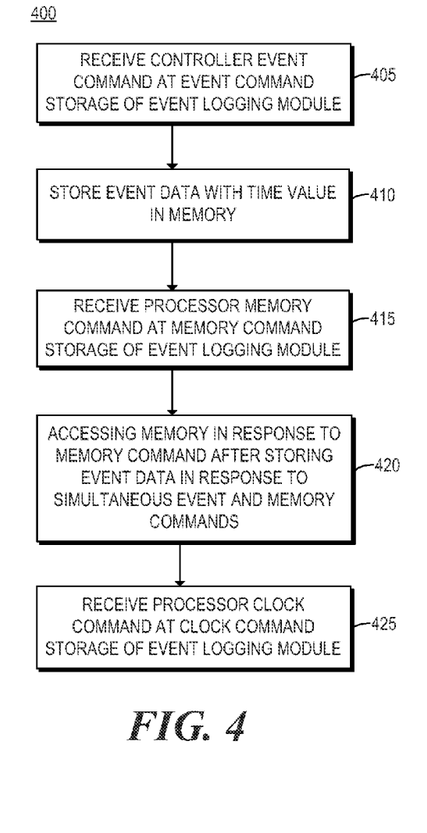
FIG. 4 is a flowchart of an example method for arbitrating between multiple commands received by an event logging module.

FIG. 4 is a flowchart of an example method 400 for arbitrating between multiple commands received by an event logging module. Although execution of method 400 is described below with reference to computing device 195 of FIG. 2, other suitable components for execution of method 400 can be utilized (e.g., computing device 195 of FIG. 1 or computing device 395 of FIG. 3). Additionally, method 400 may be implemented by a combination of storage and logic, regardless of how the logic is implemented.

At 405 of method 400, event command storage 150 of event logging module 100 may receive an event command 181 from a controller of computing device 195. In some examples, computing device 195 may include the controller, a processor, event logging module 100, real-time clock 102, and memory 104. Additionally, in some examples, the event command 181 may include event data. At 410, in response to the event command 181, a command manager 110 of event logging module 100 may store, in memory 104, the event data of the event command 181 along with a time value received from real-time clock 102. In some examples, the time value may be retrieved from real-time clock 102 in response to the event command 181 before storing the event data in memory 104. In other examples, the time value may be a time value retrieved from real-time clock 102 and stored in time storage 128 before the command manager 110 selects the event command 181 for processing.

At 415, memory command storage 164 of event logging module 100 may receive a memory command 183 from the processor, regardless of whether an event command 181 is received by event command storage 150 substantially simultaneously. For example, event logging module 100 may include a controller interface 172 and a separate processor interface 174, which may allow the controller and the processor each to provide commands to event logging module regardless of whether the other is also providing a command simultaneously. In such examples, the controller and the processor may provide commands to event logging module 100 simultaneously, each using a separate interface.

At 420, command manager 110 may access memory 104 in response to the received memory command 183, after storing the event data of event command 181 in memory 104, if the event command 181 and the memory command 183 are received by event logging module 100 substantially simultaneously. In such examples, command manager 110 may give priority to event commands 181 over memory command 183 by selecting event commands 181 for processing over memory commands 183 if received substantially simultaneously. At 425, clock command storage 160 of event logging module 100 may receive a clock command 182 from the processor.

Figure 5:
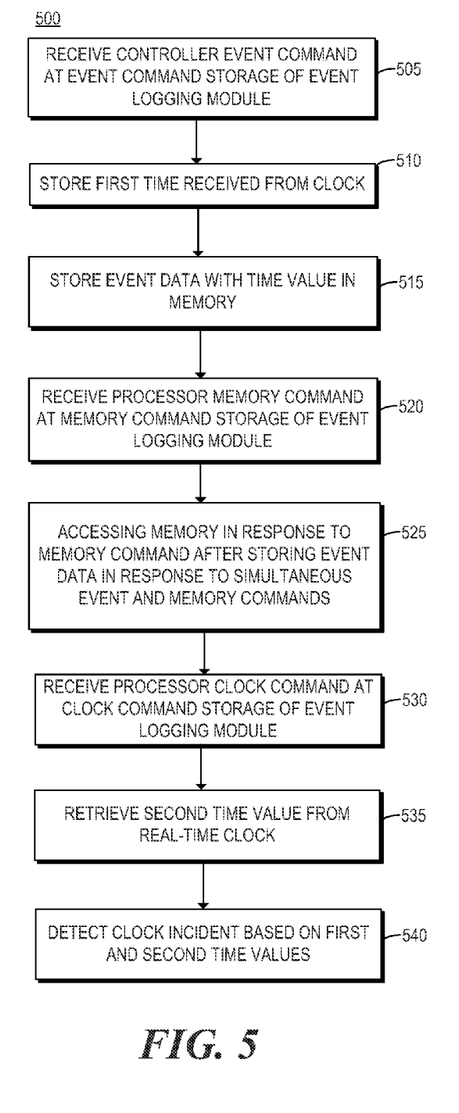
FIG. 5 is a flowchart of an example method for detecting a clock incident with an event logging module.

FIG. 5 is a flowchart of an example method 500 for detecting a clock incident with an event logging module. Although execution of method 500 is described below with reference to computing device 195 of FIG. 2, other suitable components for execution of method 500 can be utilized (e.g., computing device 195 of FIG. 1 or computing device 395 of FIG. 3). Additionally, method 500 may be implemented by a combination of storage and logic, regardless of how the logic is implemented.

At 505 of method 500, event command storage 150 of event logging module 100 may receive, from a controller of computing device 195, an event command 181 including event data. At 510, a time management module 126 of a command manager 100 of event logging module 100 may store a first time value, received from real-time clock 102, in time storage 128 of event logging module 100. In some examples, command manager 110 may retrieve the first time value from real-time clock 102 in response to the received event command 181. In other examples, command manager 110 may retrieve the first time value from real-time clock 102 based on a predetermined refresh interval and independent of the received event command 181. At 515, in response to the event command 181, command manager 110 may store, in memory 104, the event data of the event command 181 along with the first time value received from real-time clock 102.

At 520, memory command storage 164 of event logging module 100 may receive a memory command 183 from the processor, regardless of whether an event command 181 is received by event command storage 150 substantially simultaneously. In some examples, an event and memory commands 181 and 183 may be received substantially simultaneously via separate interfaces 172 and 174, respectively. At 525, command manager 110 may access memory 104 in response to the received memory command 183, after storing the event data of event command 181 in memory 104, if the event command 181 and the memory command 183 are received by event logging module 100 substantially simultaneously. In such examples, command manager 110 may give priority to event commands 181 over memory command 183 by selecting event commands 181 for processing over memory commands 183 if received substantially simultaneously.

At 530 of method 500, clock command storage 160 of event logging module 100 may receive a clock command 182 from the processor. At 535, command manager 110 may retrieve a second time value from real-time clock. In some examples, command manager 110 may retrieve the second time value in response to the received clock command 182 after storing the first time value in time storage 128. In other examples, command manager 110 may retrieve the second time value after a refresh interval has elapsed since receiving the first time value, as determined by time management module 126.

In other examples, time management module 126 may retrieve the second time value in response to the clock command 182 and after storing the first time value, if the elapsed time between receiving the first time value and the selection of the received clock command 182 for processing is greater than a refresh interval. In such examples, time management module 126 may include an internal time keeper to keep track of time independent of real-time clock 102. In some examples, the refresh interval may be an amount of time defined in time management module 126. In some examples, the refresh interval may be approximately equal to the resolution of real-time clock 102. For example, if the real-time clock maintains the present time to the nearest second, the refresh interval may be one second. In such examples, module 126 may retrieve the second time value if the elapsed time is greater than the refresh interval (e.g., greater than one second). In other examples, the refresh interval may be longer, such as a predetermined amount of time between five and ten seconds. In other examples, the refresh interval may be a different amount of time.

At 540, time management module 126 may detect the occurrence of a clock incident based on the first time value stored in time storage 128 and the received second time value. In examples described herein, detecting the occurrence of a clock incident may allow computing device 195 to mitigate the effects of the clock incident by, for example, not continuing to store event data with potentially inaccurate time values. In examples in which a time value is retrieved from real-time clock 102 in response to each event command 181 and each clock command 182, time management module 126 may detect the occurrence of a clock incident if the second time value is earlier than the stored first time value. In such examples, time management module 126 may detect a clock incident that has turned back the time maintained by real-time clock 102, reversed the operation of the real-time clock 102, or increased the rate at which real-time clock 102 runs such that at least one counter of real-time clock 102 wraps back to an initial value.

In examples in which time values are received based on a refresh interval that is approximately equal to the resolution of real-time clock 102, time management module 126 may detect the occurrence of a clock incident if the second time value is not later than the stored first time value. For example, if the resolution of real-time clock 102 is one second, then module 126 may retrieve the second time value if the elapsed time since retrieving the first time value is greater than one second, and may detect the occurrence of a clock incident if the second time value is not later than the first time value. In such examples, time management module 126 may detect a clock incident in which real-time clock 102 has been stopped.

In other examples in which time values are retrieved based on the elapse of a refresh interval, time management module 126 may detect the occurrence of a clock incident if the second time value is not within a tolerance of the sum of the first time value and the refresh interval. In such examples, the elapse of the refresh interval is tracked by time management module 126, which may have time tracking capabilities that are independent of real-time clock 102 (or any other clock external to an IC including event logging module 100). In some examples, the time tracking capabilities of module 126 may be less accurate than real-time clock 102. As such, time management module 126 may track the refresh interval within some margin of error or tolerance relative to real-time clock 102. As such, module 126 may detect the occurrence of a clock incident if the second time value is not within the tolerance of the expected time, where the expected time is the sum of the first time value and the refresh interval. For example, the tolerance may be expressed as a value T that is between zero and one and that represents the tolerance as a fraction or percentage of the refresh interval. In such examples, time management module 126 may detect a clock incident if the second time value is less than or equal to the sum of the first time value and the product of the refresh interval and the value (1−T). In such examples, time management module 126 may also detect a clock incident if the second time value is greater than or equal to the sum of the first time value and the product of the refresh interval and the value (1+T). In other examples, the tolerance may be zero, and the occurrence of a clock incident may be detected if the difference between the first and second time values is not equal to the refresh interval (e.g., one second).

What is claimed is:

1. An event logging module of a computing device, the event logging module being implemented in the form of at least one of i) electronic circuitry or ii) executable instructions encoded on a non-transitory machine-readable storage medium, wherein the at least one of the electronic circuitry and the executable instructions implement:

event command storage configured to receive, from a controller of the computing device, an event command including event data, the computing device including a processor, a real-time clock, and memory;

clock command storage configured to receive a clock command from the processor;

memory command storage configured to receive a memory command from the processor; and a command manager configured to:

retrieve a time value from the real-time clock and store the event data with the retrieved time value in the memory, in response to the event command;

access the real-time clock in response to the clock command;

access the memory in response to the memory command; and arbitrate access to the real-time clock between the event command and the clock command, responsive to a determination that the event command and the clock command are pending concurrently.

2. The event logging module of claim 1, wherein:

the command manager is configured to arbitrate access to the memory between the event command and the memory command, responsive to a determination that the event command and the memory command are pending concurrently; and the clock command storage and the memory command storage are configured to receive the clock and memory commands, respectively, via a processor interface of the event logging module.

3. The event logging module of claim 2, wherein:

the event command storage is first-in-first-out (FIFO) command storage configured to store each of a plurality of commands until respectively selected for processing by the command manager;

the clock command storage is FIFO command storage configured to store each of a plurality of commands until respectively selected for processing by the command manager; and the memory command storage is FIFO command storage configured to store a plurality of commands until respectively selected for processing by the command manager.

4. The event logging module of claim 3, wherein:

the event command storage is configured to receive the event command via a controller interface of the event logging module;

the command manager is configured to access the real-time clock and the memory in response to each event command stored in the event command storage regardless of whether any command is stored in the clock command storage or memory command storage; and the command manager is configured to access the real-time clock in response to the clock command regardless of whether any event command is stored in the event command storage.

5. The event logging module of claim 3, wherein the command manager is configured to:

delay processing of the event command, responsive to the event command being received while the command manager is processing one of the clock command and the memory command; and access the real-time clock in response to the event command responsive to both the real-time clock and the memory being available for access.

6. The event logging module of claim 3, wherein the command manager is configured to:

access the real-time clock and the memory via different buses; and access the real-time clock in response to the event command while the command manager is processing the memory command.

7. A computing device comprising:
an event logging module;
a processor configured to provide, to the event logging module, a processor clock command and a processor memory command; and
a controller configured to provide a controller event command including event data to the event logging module, regardless of any concurrent interaction between the processor and the event logging module;
wherein the event logging module is implemented in the form of at least one of i) electronic circuitry or ii) executable instructions encoded on a non-transitory machine-readable storage medium, wherein the at least one of the electronic circuitry and the executable instructions implement:
a command manager;
controller event command storage configured to receive the controller event command, wherein the command manager is configured to retrieve a time value from a real-time clock of the computing device and store the event data with the retrieved time value in memory of the computing device in response to the controller event command;
processor clock command storage configured to receive the processor clock command, wherein the command manager is configured to access the real-time clock in response to the processor clock command; and
processor memory command storage configured to receive the processor memory command, wherein the command manager is configured to access the memory in response to the processor memory command.

8. The computing device of claim 7, wherein the controller event command storage comprises:
controller clock command storage configured to receive, from the controller, a controller clock command and the controller event command; and
controller memory command storage configured to receive a controller memory command from the controller.

9. The computing device of claim 8, wherein the command manager further comprises:
a clock access module configured to access the real-time clock in response to either of the controller clock command and the processor clock command; and
a memory access module configured to access the memory in response to either of the controller memory command and the processor memory command.

10. The computing device of claim 9, wherein:
the real-time clock and the memory are separate from a chip including the processor, the controller, and the event logging module;
the command manager is configured to alternate between selecting, for provision to the clock access module, a command stored in the processor clock command storage and a command stored in the controller clock command storage, responsive to both commands being stored in both the processor clock command storage and the controller clock command storage; and
the command manager is configured to alternate between selecting, for provision to the memory access module, a first command stored in the processor memory command storage and a second command stored in the controller memory command storage, responsive to both the first command and the second command being stored in both the processor memory command storage and the controller memory command storage.

11. The computing device of claim 9, wherein the command manager is configured to:
instruct the controller clock command storage to provide the controller event command to the clock access module, wherein the controller event command further includes a clock command, a memory address, and an event flag; and
provide, to the memory access module, the event data, the memory address and clock data returned by the real-time clock in response to the event clock command, and in response to the detection of the event flag in the controller event command.

12. A method comprising:
receiving, at event command storage of an event logging module, an event command from a controller of a computing device, wherein the computing device further includes the event logging module, a real-time clock, and memory;
storing in the memory, by the event logging module and in response to the event command, event data of the event command with a first time value received from the real-time clock;
receiving, at memory command storage of the event logging module, a memory command from a processor of the computing device, regardless of whether the event command is received by the event command storage substantially simultaneously;
accessing the memory in response to the memory command, after storing the event data in the memory, responsive to the event command and the memory command being received by the event logging module substantially simultaneously; and
receiving, at clock command storage of the event logging module, a clock command from the processor.

13. The method of claim 12, further comprising:
storing the first time value received from the real-time clock in time storage of the event logging module;
retrieving a second time value from the real-time clock after storing the first time value, in response to receiving the clock command; and
detecting the occurrence of a clock incident responsive to a determination that the second time value is earlier than the stored first time value.

14. The method of claim 12, further comprising:
storing the first time value received from the real-time clock in the time storage of the event logging module;
retrieving a second time value from the real-time clock in response to selection of the clock command by a command manager of the event logging module, responsive to a determination that an elapsed time between receiving of the first time value and the selection of the clock command is greater than a refresh interval; and
detecting the occurrence of a clock incident responsive to a determination that the second time value is not later than the stored first time value.

15. The method of claim 12, further comprising:
storing the first time value received from the real-time clock in the time storage of the event logging module;
retrieving a second time value from the real-time clock after a refresh interval has elapsed since receiving the first time value; and
detecting the occurrence of a clock incident responsive to a determination that the second time value is not within a tolerance of the sum of the first time value and the refresh interval.

* * * * *